United States Patent Office 3,752,790
Patented Aug. 14, 1973

3,752,790
CHLORINATED TOLUENEDIAMINE CURING AGENTS FOR USE IN PREPARING POLYURETHANE ELASTOMERS AND FOAMS
Herbert Felix McShane, Jr., and John Joseph Verbanc, Wilmington, Del., assignors to E. I. du Pont de Nemours and Company, Wilmington, Del.
No Drawing. Original application Feb. 26, 1969, Ser. No. 802,686, now abandoned. Divided and this application May 19, 1971, Ser. No. 145,061
Int. Cl. C08g 22/16, 22/44
U.S. Cl. 260—77.5 AM                                4 Claims

ABSTRACT OF THE DISCLOSURE

Amine curing agents, for liquid polyurethanes having free isocyanate end-groups, such as 3-chloro-2,6-toluenediamine, 3-chloro-2,4-toluenediamine, 3,5 - dichloro-2,4-toluenediamine, 3,5-dichloro-2,6-toluenediamine, 5,6-dichloro - 2,4 - toluenediamine and 5-chloro-2,4-toluenediamine and a process for curing these polyurethanes. These amines generally possess suitable reactivities for use in curing both polyurethane elastomers and foams. By the proper choice of the chlorinated toluenediamines and/or their mixtures, curing rates of the formulations and certain physical properties of the cured polyurethanes (e.g. their hardness and modulus) can be controlled over a wide range.

---

This application is a division of application Ser. No. 802,686, filed Feb. 26, 1969, now abandoned.

BACKGROUND OF THE INVENTION

This invention relates to new curing agents for polyurethanes having free isocyanate end-groups. More particularly, it relates to chlorinated toluenediamines having reactivities and melting temperatures which make them particularly useful for curing isocyanate-terminated prepolymers.

Polyurethane compositions obtained by curing liquid isocyanate-terminated prepolymers are finding increased use in diverse applications requiring castable elastomers. Because of their abrasion resistance, they are frequently used as coatings on surfaces subject to mechanical wear.

The most commonly used amine curing agents are hindered or negatively substituted aromatic diamines of which 3,3'-dichlorobenzidine, 4,4'-methylenebis(2-chloroaniline) and 2,5,3'-trichloro-4,4'-diaminodiphenylmethane are representative. To a lesser extent, unhindered aromatic diamines such as 4,4'-methylenedianiline and phenylenediamines are used. The main advantage of the hindered diamine curing agents is their long "pot life" which in some cases facilitates molding operations. "Pot life" is the time lapse after initial contact of the prepolymer with the curing agent during which pouring of the liquid polymer composition into molds still is possible. In spray applications, long pot life is undesirable because the freshly mixed and sprayed material often sags or drips before setting up. In the preparation of polyurethane foams the use of hindered amines results in the further disadvantage of slow gel strength development which delays the foam demolding time. On the other hand, the unhindered aromatic diamines are so reactive that molding of polyurethanes in which they might be used, whether foamed or otherwise, is almost impossible and in spraying applications gelling of the polyurethane occurs before the sprayed material has a chance to form an even coating. Furthermore, the highly reactive unhindered amines cause frequent plugging of spray equipment employing internal mixing. Generally, the relatively high melting points of both hindered and unhindered diamines make them difficult to mix with the liquid isocyanate-terminated prepolymers and awkward to handle in the absence of a solvent. This is particularly true when the curing agents are used in the field.

There has been a need in the art, therefore, for amine curing agents having controlled reactivities under normal operating conditions to permit the desired degree of cure to be achieved within practical and economically attractive time ranges and having sufficiently low melting points to allow them to be readily blended with the curable elastomer compositions at relatively low temperatures.

SUMMARY OF THE INVENTION

It has been descivered that certain chlorinated toluenediamines are excellent curing agents for liquid isocyanate-terminated polyurethanes. In particular, the present invention contemplates the use as curing agents of the following chlorinated m-toluenediamines: 3-chloro-2,4-toluenediamine (Formula I), 3-chloro-2,6-toluenediamine (Formula II), 3,5-dichloro-2,4-toluenediamine (Formula III), 3,5-dichloro-2,6-toluenediamine (Formula IV), 5,6-dichloro-2,4-toluenediamine (Formula V), and 5-chloro-2,4-toluenediamine (Formula VI).

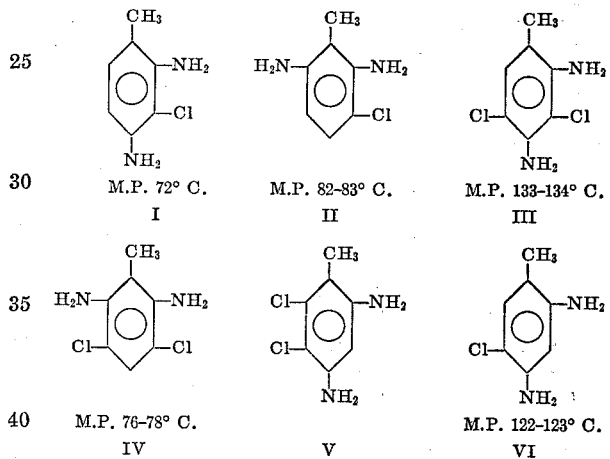

These diamines can be readily prepared by chlorination of toluene-2,4- or 2,6-diisocyanates, depending on the particular product desired, with chlorine gas in the presence of a catalyst, such as ferric chloride or iodine, and subsequent hydrolysis with a strong acid, such as 70% sulfuric acid.

A polyurethane prepolymer having free isocyanate groups can be cured by blending the prepolymer with one or more chlorinated m-toluenediamines of the present invention, and preferably heating at a temperature of about 70–120° C., although lower temperatures may be useful in some situations, such as spray application. Generally, such amount of diamine is used that there are 0.6–1.1 gram-equivalents of the amine groups per gram-equivalent of the isocyanate groups.

These diamines have reactivities which bridge the gap in reactivities characterizing the amine curing agents currently available. In particular, the monochlorinated m-toluenediamines are more reactive than the commonly used 4,4'-methylenebis(2-chloroaniline) but considerably less reactive than unhindered aromatic diamines, while the dichlorinated m-toluenediamines are less reactive than 4,4'-methylenebis(2-chloroaniline) and have reactivities similar to that of 2,5,3'-trichloro-4,4'-diaminodiphenylmethane. Furthermore, because of their relatively low melting points, the new compositions can be readily mixed with liquid polyisocyanates in conventional equipment at moderate temperatures. Cured polyurethanes containing these new agents have excellent properties, so that the advantages of this invention are attained without sacrifice of cured product properties. Moreover, by the proper selection of one or more chlorinated toluenediamines in the curing formulation, certain properties of the cured polyurethanes, such as hardness and modulus, can be predetermined. Thus, dichloro-toluenediamines and their combinations with monochloro-toluenediamines can give somewhat softer polyurethane vulcanizates than those obtained when monochlorotoluenediamines alone are used as the curing agents.

These new curing agents are also suitable for preparing cellular polyurethanes by mixing a curing agent and an isocyanate-terminated prepolymer in the presence of an expanding agent, such as methylene chloride or trichlorofluoromethane; or by a one-shot process in which a curing agent, a diisocyanate, and a polyol are mixed in the presence of an expanding agent.

Compared with the most commonly used curing agents of the prior art [i.e. 3,3' - dichlorobenzidine and 4,4'-methylenebis(2-chloroaniline)] a lesser amount of the new curing agents per equivalent of free isocyanate groups is required.

DETAILED DESCRIPTION

Preparation of Compound VI was reported in 1900 by Reverdin and Crépieux, Berichte, 33, 2505 who made this amine by nitration of m-chlorotoluene and reduction of the thus produced 5 - chloro-2,4-dinitrotoluene. The remaining chlorotoluenediamines I, II, III, IV and V are new compounds. All five amines can be readily prepared from commercially available m-toluenesdiisocyanates. Toluene-2,4-diisocyanate and mixtures thereof with toluene-2,6-diisocyanate, e.g. a mixture of 65% toluene-2,4-diisocyanate and 35% toluene-2,6-diisocyanate, are made commercially in large quantities. m-Toluenediisocyanates thus constitute an inexpensive starting material.

A preparation of these amines involves chlorination of the isocyanate and hydrolysis of the isocyanate groups in the presence of a strong acid. This can be illustrated by the following equations:

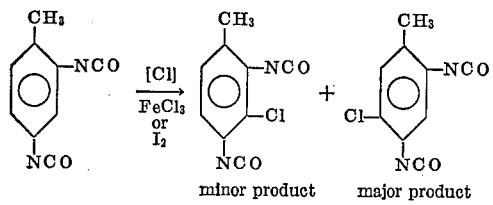

and

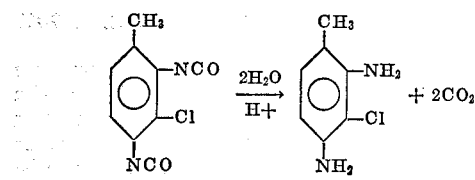

The six curing agents of the present invention are moderately low melting crystalline materials. Although polyurethane prepolymers can be cured with Compound VI to vulcanizates of excellent physical properties, the melting point 122–123° C. of Compound VI is somewhat higher than preferred for use of this compound by itself. This difficulty can be avoided by using mixtures of Compound VI with other monochloro- and dichloro-m-toluenediamines. Such mixtures melt at lower temperatures than the highest melting individual amine and thus are particularly suitable for curing liquid polyurethane prepolymers having isocyanate end groups, especially when mixing is carried out at relatively low temperatures, e.g. prior to pouring into molds. Diamine mixtures can be made either by mixing the individual compounds or by chlorination and hydrolysis of 2,4-toluene-diisocyanate, 2,6-toluenediisocyanate and their mixtures.

A specially suitable monochloro-m-toluenediamine curing agent composition of relatively high reactivity can be obtained from a commercial mixture of 65% toluene-2,4-diisocyanate, and 35% toluene-2,6-diisocyanate. The curing composition consists of a mixture of Compounds I, II, and VI in approximate respective proportions of 8:32:60 parts by weight. It has a melting point of 95° C., which is low enough to allow the mixture to be readily blended with the polyurethane prepolymer, yet high enough to prevent the curing agent from becoming tacky in storage at relatively high temperatures, such as may occur during a hot summer. Other binary or ternary mixtures of Compounds I, II and VI can be used, preferably having melting points lower than 105° C.

Preferred curing agent compositions of moderate reactivity can be obtained by chlorinating commercial mixtures of 65–80% toluene-2,4-diisocyanate and 35–20% toluene-2,6-diisocyanate to such an extent that from 10–50% of the chlorination product consists of dichloro-toluenediisocyanate isomers, the remainder being monochlorotoluenediisocyanate isomers. After hydrolysis, curing compositions consisting of mixtures of all six chlorinated diamine isomers are obtained. All of these compositions have melting points which permit convenient mixing with polyurethane prepolymers.

The melting point can be determined by a simple laboratory technique, such as placing a test tube containing the material in a heating bath, slowly raising the temperature while stirring the material with a thermometer, and recording the temperature at which no solid remains in the test tube. Monochlorination of toluene-2,4-diisocyanate followed by hydrolysis yields, under the experimental conditions described below, a mixture of 75–95% Compound VI and 5–25% Compound I. Monochlorination of toluene-2,6-diisocyanate and hydrolysis yields under the same conditions virtually pure Compound II. Dichlorination and hydrolysis of toluene-2,4-diisocyanate yields a mixture of Compound III, which is the major product, and Compound V; while toluene-2,6-diisocyanate yields substantially pure Compound IV. It is thus possible, by selecting the initial proportions of toleune-2,4- and -2,6-diisocyanates, to vary the proportions of mono- and dichloro-m-toluenediamine isomers produced and to control the melting temperatures and reactivities of the mixtures.

Chlorination of m-toluenediisocyanates can be carried out, in the manner described in U.S. Pats. 2,915,545 and 3,234,184. Generally, chlorine gas is introduced into strongly agitated m-toluenediisocyanate containing either ferric chloride or iodine as catalyst. About 1/10 to 1/2 % by weight of the catalyst, based on the weight of toluenediisocyanate, is used to make monochloro-m-toluenediisocyanates. For the preparation of dichloro-m-toluenediisocyanates it is usually advantageous to increase the catalyst concentration to 1/4–3% by weight. Certain other catalysts, such as aluminum chloride and zinc chloride, can also be used. The reaction is run in the absence of actinic light to avoid chlorination of the methyl groups. It is preferable to supply an excess of 5–10% chlorine for each chlorine atom which is to be introduced into the ring. The chlorination temperature is maintained within the range of 50–110° C. and preferably 65–100° C. At temperatures lower than about 50° C. insoluble carbamyl chlorides form, while above 110° C. excessive chlorination of the methyl groups can take place. After the addition of chlorine is complete, the crude reaction product is either heated in vacuum or sparged with nitrogen at a temperature of from 120° C. to 210° C. to remove hydrogen chloride formed in the reaction. The reaction product can then be fractionated at a reduced pressure, or it can be used without purification in the hydrolysis step.

Chlorinated m-toluenediisocyanates are hydrolyzed to the corresponding diamines, preferably in the presence of a strong acid. A highly acidic medium is maintained at all times, and an excess acid must be preserved at the end of the reaction. The amine formed in the hydrolysis step is thus converted to its salt. Should the amount of acid be inadequate to neutralize the amine as it is formed, the free amine could undergo further reactions with the unhydrolyzed isocyanate groups to form ureas and/or more complex products. It has been found practical to use four moles of the acid per mole of the diisocyanate initially present. Any strong acid, such as e.g. sulfuric acid, hydrochloric acid, benzenesulfonic acid, and phosphoric acid, can be used. However, best results are obtained with sulfuric acid of 70% by weight concentration. Generally, the concentration of sulfuric acid can vary from about 60% to about 98% by weight. When 70% sulfuric acid is used, the reaction is preferably carried out at a temperature of from 110° C. to 120° C., but progressively lower temperatures are necessary as the concentration of the acid increases. When 98% sulfuric acid is used, the reaction is best carried out at room temperature to avoid undesirable side reactions, such as sulfonation of the benzene rings. Following hydrolysis, the free amines are obtained by neutralizing the crude hydrolysis product with a base such as sodium hydroxide.

The curing agents of this invention are employed in substantially the same manner as are conventional diamine curing agents. They are particularly useful for curing isocyanate-terminated prepolymers based on either polyether or polyester glycols.

Generally, useful vulcanized polyurethane elastomers can be obtained by employing the chlorinated m-toluenediamines of this invention in amounts such that there are about 0.6 to 1.1 gram-equivalents of amine groups per gram-equivalent of isocyanate groups. When substantially more than about 1.1 gram-equivalents of the amine groups per gram-equivalent of the isocyanate groups are present, a desirable degree of vulcanization of the polyurethane elastomer generally is not achieved, while substantially smaller amounts of the amine than 0.6 gram-equivalent per equivalent of the isocyanate lead to a highly crosslinked material which is deficient in desirable elastic properties.

Both polyalkylene ether glycol- and polyester glycol-based polyurethane prepolymers can be cured by the process of this invention. A typical example of the former is Adiprene® L–100 (Du Pont) which is made by condensation of poly(1,4-oxybutylene) glycol with toluene-diisocyanate. It has an approximate molecular weight of 2000 (G. H. Saunders and K. C. Frisch, Polyurethanes, Chemistry and Technology; Part II. Technology. Interscience Publishers, New York, 1964, p. 341 and Appendix F, p. 857). The free isocyanate content of this prepolymer is about 4.1%. Adiprene® L–167, made from the same starting materials, has a free isocyanate content of about 6.3%.

Polyurethane prepolymers can be based on other polyalkylene ether glycols, e.g. polypropylene ether glycols and mixed polyalkylene ether glycols obtained by condensation of ethylene oxide, 1,2-propylene oxide and 1,2-butylene oxide with glycols having more than two carbon atoms.

Generally, these polyether glycols can be prepared by the polymerization of cyclic ethers, such as tetrahydrofuran or epoxides or by the addition of epoxides to glycols, dihydroxyethers, dihydroxythioethers, dihydric phenols and the like by known methods. Polyalkylene ether glycols suitable for the preparation of polyurethane prepolymers should have a molecular weight of at least 500, although it can be as high as 10,000. Molecular weights of about 750 to 3000 are preferred. Optionally, glycols having molecular weights of less than about 350 can be added to the high molecular weight glycols. These low molecular weight glycols can be used in proportions of about 0.5–3.0 moles per mole of polyether glycol, but the exact proportions are determined by the desired physical properties of the final products.

Representative glycols include ethylene glycol, 1,2-propylene glycol, 1,2-butylene glycol, 1,3-butanediol, 1,4-butanediol, 1,5-pentanediol, 1,10-decanediol, 3-cyclohexene-1,1-dimethanol, diethylene glycol, dipropylene glycol, and the like. Mixtures of two or more of these low molecular weight glycols may be used.

Polyurethane prepolymers which can be employed in the process of this invention can also be based on polyester glycols, such as poly(ethylene adipate), poly(ethylene/propylene adipate), poly(ethylene glutarate), and poly(ethylene pimelate). Polyester glycols suitable for the preparation of polyurethane prepolymers can be made by several alternate routes, such as: condensation of a dicarboxylic acid with an excess of a diol, transesterification of a dicarboxylic acid ester of a lower alcohol with a diol, or reaction of dicarboxylic acid dichloride with a diol, optionally in the presence of a proton acceptor. Aliphatic dicarboxylic acids and alkanediols are preferred because of the desirable physical properties of the final products. However, aromatic dicarboxylic acids, such as terephthalic acid, and dihydric phenols, such as hydroquinone or resorcinol, also can be used in the preparation of polyester glycols suitable for making polyurethane prepolymers. Generally, the above described polyester glycols should have a molecular weight of 500–5000, a molecular weight of 750–3000, being preferred.

Polyurethane prepolymers are made by reaction of a polyalkylene ether glycol or a polyester glycol with an excess of an organic diisocyanate. Because of their greater reactivity, aromatic diisocyanates are preferred but aliphatic or araliphatic diisocyanates also can be used. Representative isocyanates include toluene-2,4-diisocyanate, toluene-2,6-diisocyanate, benzene-1,3-diisocyanate, naphthalene-1,5-diisocyanate, methylenebis(4-phenyl isocyanate), 4,4'-biphenylenediisocyanate, hexamethylene diisocyanate, 1,4-cyclohexanediisocyanate, and methylenebis(4-cyclohexane isocyanate). Mixtures of two or more diisocyanates may be employed. The addition of minor amounts of aliphatic or cycloaliphatic diisocyanates to prepolymers based on aromatic diisocyanates is useful for increasing the hardness of cured products without decreasing the pot life. The amount of the diisocyanate which is to be used in the preparation of polyurethane prepolymers can be varied from about 1.1 to 2 moles per mole of glycol. The resulting prepolymers have a free NCO content of from about 2.5 to 10 weight percent.

It is usually undesirable to mix the prepolymer with the curing agent at a temperature substantially below 70° C. because of the relatively high viscosity of the prepolymer at such low temperatures and the resulting difficulty in obtaining a homogeneous blend. Furthermore, when molten curing agents are added to the cold prepolymer, undesirable solidification of the curing agent may take place.

The upper temperature limit for blending and curing depends on the thermal stability of both the prepolymer and the curing agent. Polyurethane prepolymers having terminal isocyanate groups can undergo side reactions at elevated temperatures. For instance, the urethane groups of the polymer backbone may at elevated temperatures undergo further reactions with the isocyanate groups to form allophanates.

Unstabilized chlorinated m-toluenediamines of the present invention should not be heated to temperatures higher than about 120° C. for extended periods of time because of possible danger of dehydrochlorination which is generally obtained with halogenated aromatic amines. Dehydrohalogenation is acid catalyzed and the addition of basic materials such as sodium hydroxide, morpholine and piperazine in small amounts markedly improves the heat stability of chlorinated m-toluenediamines. Aromatic amines also are known to readily undergo oxidation reactions at higher temperatures.

It has been found that a good degree of vulcanization is achieved with the monochloro-m-toluenediamine curing agents of the present invention in shorter times than has been heretofore possible with the usual curing agents of the prior art. This higher reactivity results in a considerable economy of time in molding or casting polyurethane elastomers. Nevertheless, the monochlorinated m-toluenediamines of the present invention are not so reactive that processing of their mixtures with the most commonly used polyurethane prepolymers, containing up to about 7% free NCO groups, would be either impossible or inconvenient. These formulations have sufficiently long pot lives to allow good mixing and pouring into molds. When curing prepolymers having high NCO contents or when a longer pot life is desired, mixtures of mono- and dichloro-m-toluenediamines can be used to advantage. In extreme cases, mixtures of dichloro-m-toluenediamine isomers are useful and provide a substantially longer pot life than does 4,4'-methylene bis(2-chloroaniline).

The pot lives, demolding times, and full-cure times of isocyanate-terminated prepolymer formulations containing curing agents are of considerable importance in the polyurethane curing process. While the pot lives must not be too short, the demolding times should not be unnecessarily long since molding equipment is tied up until the polymer is sufficiently cured to permit its removal from the molds and completing the process in an oven. Generally, a pot life of at least one minute is desirable but a pot life of at least three minutes is preferred to allow good compounding of the curable composition. A demolding time of 5–15 minutes is preferred for reasons of time economy, although a demolding time of one hour or more still can be satisfactory for some applications. The approximate pot lives, demolding times, and full cure times at 100° C. of Adiprene® L–100 formulated with 4,4'-methylenebis(2-chloroaniline) (MOCA®, Du Pont); with a mixture of Compounds I, II, and VI; and a mixture of mono- and dichloro-m-toluenediamines are compared in Table I, below.

TABLE I

|  | MOCA® | Monochloro amines a | Mono- and dichloro- amines b |
|---|---|---|---|
| Pot life, minutes | 15 | 3–4 | 6 |
| Demolding time, minutes | 20–30 | 10 | 15–20 |
| Full cure time, hours | 1–3 | ½–2 | 2–4 | a Mixture of Compounds I, II, and VI in ratio of 8:32:60.
b Mixture of I, II, III, IV, V and VI containing 65.8% of monochloro-m-toluenediamines and 30% dichloro-m-toluenediamines, together with 1.5% trichloro-m-toluenediamines and 2.7% nonvolatiles.

Although dichloro-m-toluenediamines alone are slow-acting curing agents, they may be suitable for use with prepolymers which have a very high NCO concentration. Table II, below, compares pot life, demolding time, and full cure time data for a prepolymer having NCO concentration 9.3% cured with such an amine mixture and with MOCA® at 100° C.

TABLE II

|  | MOCA® | Dichloro-m-toluenediamine a |
|---|---|---|
| Pot life, minutes | 1 | 4–5 |
| Demolding time, minutes | 2 | 25–30 |
| Full cure time, hours | 1 | 3–4 | a Mixture of about 54% III, 19% IV, and 27% V.

The prepolymer is made by condensation of one mole poly(tetramethylene ether) glycol, one mole 1,3-butanediol, and four moles toluenediisocyanate (80% 2,4- and 20% 2,6-isomers). It has a molecular weight of about 890.

The advantages of this invention are obtained without sacrificing physical properties. In particular, when the curing agents I, II, or VI are employed, the resulting vulcanizates have high hardness. When dichlorotoluenediamines of Formulas III, IV, or V are employed the resulting vulcanizates are generally somewhat softer. An intermediate range of hardness is obtained when mixtures of monochloro- and dichlorotoluenediamines are employed, and this invention thus provides considerable versatility. Harder polyurethane elastomers are especially useful for heavy duty application, where their toughness and abrasion resistance are important, e.g. solid wheel tires for forklift trucks and machine rolls. Softer polyurethane elastomers are of interest in such applications as rings and seals, printing blankets, and encapsulating materials. Other properties of polyurethane elastomers also can be affected by the choice and the level of the curing agent, e.g. compression set, abrasion resistance, and tear and tensile strength.

The chlorinated m-toluenediamines of the present invention also are useful in the preparation of polyurethane foams. They can be employed in prepolymer, semi-prepolymer, and one-shot foam processes in which they replace a portion of the active hydrogen usually supplied by water and/or a polyol. The techniques of preparation of foams by each of these processes are well known and can be varied depending on the type of product desired. Representative foam compositions are those prepared from polyisocyanates such as toluenediisocyanates, methylenebis(phenyl isocyanate) and its substituted derivatives and polyarylene polyisocyanates; polyols such as polyalkylene ether polyols and polyester polyols; and an expanding agent such as fluorotrichloromethane and carbon dioxide, the latter being generated on addition of water. The use of polyamines in general in the preparation of water-blown prepolymer polyurethane foams is described in U.S. Pat. 2,850,464. The mono-chlorinated m-toluenediamines of this invention, alone or admixed with dichlorinated m-toluenediamines, can be used to advantage for preparing either flexible or rigid foams, but they are especially useful in making semi-rigid, medium and high density self-skinned foams, which are finding increasing use in the fabrication of interior and exterior automobile trim.

The quantity of the amine used relative to the usual foam ingredients can be varied widely. In prepolymer processes, when all of the polyol has been allowed to react with diisocyanate or polyisocyanate prior to foam formation, the amine can even be used as the sole reactant with the prepolymer during the foaming step, provided a volatile expanding agent also is present. In either semi-prepolymer or one-shot processes, it is usually preferred to use a mixture of amine and polyol, with about 15–85% of the total active hydrogen in the system being provided by the amine. It is particularly convenient in these processes to dissolve the amine curing agent in the polyol component of the formulation prior to mixing with the polyisocyanate.

The invention will now be described with reference to the following examples of specific embodiments thereof, wherein parts and percentages are by weight unless otherwise specified.

The properties of the vulcanizates reported in the examples are measured in accordance with the following ASTM procedures:

| Tear strength | D–470 |
| Tensile strength | D–412 |
| Elongation at break | D–412 |
| Modulus | D–412 |
| Compression set | D–395 |
| Resilience, bashore | D–1054 |
| Abrasion resistance | [1] D–394 |
| Hardness | D–676 |

[1] Method B, NBS.

A cross-head speed of 20 in./min. is used for the stress-strain measurements obtained by ASTM–D–412.

Whenever the phrase "consisting essentially of . . ." is used in this specification or in the claims, it means that the operative steps or the materials recited after that phrase are an essential part of the invention, but that materials or operative steps not specifically recited, are not excluded so long as they do not prevent the advantages of the invention from being realized.

EXAMPLE 1

Preparation of 3-chloro-2,6-toluenediamine (Compound II)

(a) *Chlorination.*—Toluene - 2,6 - diisocyanate (350 parts) is charged to a well agitated reactor fitted with a submerged gas inlet tube and a spray trap mounting a −85° C. condenser. Anhydrous ferric chloride (2.0 parts) is added and the mixture is heated to 90° C., at which temperature chlorine is introduced through the gas inlet tube. Over 90 minutes, 143 parts of chlorine is introduced while the temperature is maintained at 92.5–95° C. The reaction mass is then sparged with nitrogen at 160° C. to remove hydrogen chloride. The reaction mass is distilled at 0.8 mm. Hg (B.P. range 99–104.5° C.) to separate volatile products from tars and catalyst. The distillate is found by gas chromatography to contain 90.2 mole percent 3-chloro-toluene-2,6-diisocyanate, 3.2 mole percent unchanged toluene-2,6-diisocaynate, 6.1 mole percent 3,5 - dichlorotoluene-2,6-diisocyanate and 0.5 mole percent of unidentified volatile materials. The conversion of toluene-2,6-diisocyanate to 3-chlorotoluene-2,6-diisocyanate is about 86%. By fractional distillation in a spinning band column at about 1.2 mm. Hg, head temperature 108–109° C., 3-chlorotoluene-2,6-diisocyanate having a purity of 99.5 mole percent greater is obtained.

(b) *Hydrolysis.*—To a solution of 160 parts of distilled water and 320 parts of sulfuric acid (98%) in an agitated reactor is added 159 parts of molten, 99.5% pure 3-chlorotoluene-2,6-diisocyanate over 2.5 hours at 107–114° C. After the addition is complete, the reaction mass is held under nitrogen for about 25 minutes at 110° C. and then 370 parts of distilled water is added. After 10 minutes, the resulting solution is filtered to remove a small quantity of insoluble material. To the filtrate is added a solution of 282 parts of sodium hydroxide (97%) in 660 parts of distilled water. 3-chloro-2,6-toluenediamine separates as an oil which floats on the hot aqueous phase maintained at 95–100° C. The oil layer is decanted, dried by heating at 105° C. and 8 mm. Hg pressure, and finally filtered. The clear brown oil crystallizes on cooling and the solid melts at 82–83° C. The yield of 3-chloro-2,6-toluenediamine is 103 parts (87% of theory) with a purity of 99.3 mole percent determined by gas chromatography.

EXAMPLE 2

Preparation of dichloro-m-toluenediamines III, IV, and V.

(a) 3,5-dichlorotoluene-2,6-diamine (Compound IV).— Toluene-2,6-diisocyanate (350 parts) is chlorinated with 286 parts of chlorine at 90–95° C. in the presence of 10 parts of ferric chloride. Following the operating procedure of Example 1, 3,5-dichlorotoluene-2,6-diisocyanate is obtained as a crystalline solid; M.P. 80.4° C., B.P. 164° C. at 10 mm. Hg. Hydrolysis of the diisocyanate with 70% sulfuric acid gives 3,5-dichloro-2,6-toluenediamine (Compound IV), M.P. 76–78° C.

(b) 3,5 - dichlorotoluene - 2,4 - diamine (Compound III).—Toluene-2,4-diisocyanate is clorinated in a similar manner and yields a distilled product from which pure 3,5 - dichlorotoluene-2,4-diisocyanate is obtained by recrystallization as a wax; F.P. 62.9° C. The diisocyanate is hydrolyzed with 70% sulfuric acid to 3,5-dichloro-2,4-toluenediamine (Compound III), M.P. 133–134° C.

All isocyanates and amines in (a) and (b) give correct elemental analysis.

(c) Mixture of Compound III with 5,6-dichlorotoluene-2,4 - diamine (Compound V).—Toluene-2,4-diisocyanate (350 parts) is chlorinated at 80° C. with 185 parts chlorine in the presence of 3.5 parts of anhydrous ferric chloride over a period of 3 hours. The crude reaction mixture is distilled at a reduced pressure. A portion of monochlorotoluene-2,4-diisocyanate is removed by fractional distillation leaving a residue found by gas chromatography to consist of 68.9% of monochlorotoluene-2,4-diisocyanate, 26.7% of dichlorotoluene-2,4-diisocyanate, and 4.4% of trichlorotoluene-2,4-diisocyanate.

The chlorotoluenediisocyanate mixture is hydrolyzed with 70% sulfuric acid, and the resulting diamine mixture (M.P. 95–96° C.) is trifluoroacetylated. Gas chromatographic analysis shows that the dichlorotoluenediamine fraction consists of two isomers, namely 3,5-dichlorotoluene-2,4-diamine (Compound III) and 5,6-dichlorotoluene-2,4-diamine (Compound V). Compound III is the major component of the dichlorotoluenediamine fraction (about 60–70%). Each isomer is identified by its nuclear magnetic resonance spectrum. The trifluoroacetyl derivatives of III and V sublime at about 234° C. and 177° C., respectively.

EXAMPLE 3

Preparation of an isomeric mixture of monochloro-toluenediamines

The monochlorination procedure of Example 1 is repeated using as starting material, a mixture of 65% toluene-2,4-diisocyanate and 35% toluene-2,6-diisocyanate, an equimolar amount of chlorine, and 0.5% ferric chloride based on the weight of the isocyanates, as catalyst. The crude chlorination product is refined by fractional distillation at 6 mm. Hg pressure through a packed column. After removal of a small amount of unchanged starting material, a monochloro-toluenediisocyanate fraction boiling at 135° C. is collected. This fraction has a monochloro-toleunediisocyanate content of 99+% as determined by gas chromatography. Hydrolysis of the fraction according to the procedure of Example 1 leads to an isomeric mixture of chloro-toluenediamines in 90–95% yield. The diamine mixture is completely molten at 95° C. and consists of 5-chloro-2,4-toluenediamine (VI) (ca. 60%), 3-chloro-2,4-toluenediamine (I) (ca. 8%) and 3-chloro-2,6-toluenediamine (II) (ca. 32%). Calc. for $C_7H_9N_2Cl$ (156.6) (percent): N, 17.9; Cl, 22.7. Found (percent): N, 17.7; Cl, 22.7.

3-chloro-2,4-toluenediamine (I) is isolated from this mixture (or from the mixture of isomers resulting from the monochlorination of toluene-2,4-diisocyanate followed by hydrolysis) by gas chromatography and identified by its elemental analysis and its nuclear magnetic resonance spectrum. It is a crystalline solid, M.P. 72° C.

EXAMPLE 4

Preparation of an isomeric mixture of dichloro-toluenediamines

A mixture consisting of 80% toluene-2,4-diisocyanate and 20% toluene-2,6-diisocyanate is dichlorinated in the presence of 3% of ferric chloride based on the weight of the isocyanates, under the conditions given in Example 1. The chlorination product is separated from tars and catalyst by vacuum distillation and consists of monochloro-toluenediisocyanate (ca. 3.2%), dichloro-toluenediisocyanate (ca. 81.5%), and trichloro-toluene-diisocyanate (ca. 13.8%). Further purification of the distilled material by fractionation on a spinning band column at 10 mm. Hg yields a cut boiling at 165–166° C. After hydrolysis of this fraction by the procedure of Example 1, a mixture of isomeric dichloro-toluenediamines is obtained which is found by gas chromatography of the trifluoroacetyl derivatives to contain 3,5-dichloro-2, toluenediamine (III) (about 54%), 3,5-dichloro-2,6-6-toluenediamine (IV) (about 19%), and 5,6-dichloro-2, 4-toluenediamine (V) (about 27%). Gas chromatography cannot be used directly for the determination of relative concentrations of the above three amines because of overlapping of the peaks of the trifluoroacetyl derivatives of Compounds IV and V (a 10-foot ⅛-inch O.D. column of 80–100 mesh silanized diatomaceous earth impregnated with 5% polyphenyl ether is used; column maintained at a constant temperature of 220° C.). The respective percentages are, therefore, calculated from the ratio of Compounds III and V obtained in Experiment 2(c) describing chlorination and hydrolysis of pure toluene 2,4-diisocyanate. The mixture of Compounds III, IV, and V obtained from a toluenediisocyanate consisting of 80% of the 2,4-isomer and 20% of the 2,6-isomer has a melting range of 105–113° C.

EXAMPLE 5

(A) Preparation of Prepolymer A

A mixture consisting of 278.7 parts of toluene-2,4-diisocyanate and 1000 parts of anhydrous polytetramethylene ether glycol (number-average molecular weight 1000) is agitated at 80° C. for 4 hours in a dry reaction vessel protected from atmospheric moisture. The resulting fluid product has a free-NCO content of 4.1% by weight, a Brookfield viscosity at 30° C. of about 16,500 cps. and a number-average molecular weight of about 2000.

(B) Preparation of Prepolymer B

A mixture containing 348.8 parts of toluene-2,4-diisocyanate and 1000 parts of anhydrous polytetramethylene ether glycol (number-average molecular weight 1000) is agitated at 80° C. for 4 hours in a dry reaction vessel protected from atmospheric moisture. The fluid product has a free NCO content of 6.3% by weight, a Brookfield viscosity at 30° C. of 6000 to 7000 cps., and a number-average molecular weight of about 1348.

(C) Curing of Prepolymer A with Compound VI (1) Prepolymer A (50 g.) is mixed after degassing at 100° C. with 3.9 g. of molten 5-chloro-2,4-toluenediamine (VI) (100% of theory) and the resulting liquid mixture is poured into a heated mold and cured by heating for 3 hours at 100° C. The pot life is 2–3 minutes and the vulcanizate can be demolded after 5–10 minutes.

(2) The above procedure is repeated except that 6.5 g. of MOCA® (100% of theory) is used as the diamine. The pot life is about 15 minutes and the demolding time 20–30 minutes. The properties of both vulcanizates are presented in the following table:

TABLE III

| | Compound VI | MOCA® |
|---|---|---|
| 100% modulus, p.s.i. | 1,250 | 1,100 |
| 300% modulus, p.s.i. | 1,975 | 1,950 |
| Tensile strength, p.s.i. | 5,075 | 4,100 |
| Elongation, percent | 530 | 440 |
| Hardness, Shore A | 88 | 90 |
| Tear strength, D-470, p.l.i. | 87 | 85 |
| Compression Set B, 22 hr./70° C. | 46 | 45 |
| Bureau of Standards abrasion index | 256 | 175 |

EXAMPLE 6

Curing Prepolymers A and B with Compounds II and IV and with a mixture of Compounds II and VI Prepolymer A of Example 5 is cured according to the procedure of Example 5 with 3-chloro-2,6-toluenediamine (II), 3,5-dichloro-2,6-toluenediamine (IV) and low melting (95° C.) mixture consisting of 35% 3-chloro-2,6-toluenediamine (II) and 65% 5-chloro-2,4-toluenediamine (VI). Prepolymer B of Example 5 is cured by the same procedure with 3,5-dichloro-2,6-toluenediamine (IV). The proportions of the reactants and the physical properties of the resulting vulcanizates (after conditioning for three days at 50% relative humidity) are shown in the following table, together with corresponding data for a prior art MOCA® vulcanizate.

TABLE IV

| | Compound | | | | |
|---|---|---|---|---|---|
| | II | IV | II and VI | IV | MOCA® |
| Prepolymer A, pts. | 100 | 100 | 100 | | 100 |
| Prepolymer B, pts. | | | | 100 | |
| Compound II, pts. | 7.3 | | 2.6 | | |
| Compound IV, pts. | | 9.0 | | 13.7 | |
| Compound VI, pts. | | | 4.7 | | |
| MOCA, pts. | | | | | 12.4 |
| Curative level, percent of theory | 95 | 95 | 95 | 95 | 95 |
| Tensile strength, p.s.i. | 3,400 | 2,650 | 3,920 | 5,250 | 3,850 |
| Elongation at break percent | 405 | 500 | 580 | 370 | 460 |
| Modulus 100%, p.s.i. | 1,350 | 730 | 1,100 | 1,670 | 1,000 |
| Modulus 300%, p.s.i. | 2,450 | 1,290 | 1,580 | 3,600 | 1,650 |
| Split tear D-470, p.l.i. | 101 | 77 | 144 | 88 | 85 |
| Compression Set B, percent | 33 | 52 | 51 | 71 | 39 |
| Resilience, Bashore, percent | 49 | 45 | 47 | 41 | 46 |
| NBS abrasion, percent | | | 296 | | 139 |
| Hardness, Durometer A | 90 | 80 | 88 | 91 | 90 |

EXAMPLE 7

Preparation of a mixture of monochloro-dichloro-m-toluenediamines (a) Chlorination.—A commercial mixture of 65% toluene-2,4-diisocyanate and 35% toluene-2,6-diisocyanate (261 g., 1.5 moles) is chlorinated at 70° C. with 138.5 g. (1.95 moles) of chlorine in the presence of 0.65 g. iodine. The reaction mass is sparged with nitrogen at 70–160° C. to remove hydrogen chloride. The reaction product is a light-colored liquid, which is found by gas chromatography to consist of the following proportions of chloro-isocyanates; expressed in weight percent:

Monochlorotoluenediisocyanate _____ 71.10
Dichlorotoluenediisocyanate _____ 28.49
Trichlorotoluenediisocyanate _____ Less than 0.5

(b) Hydrolysis.—The above mixture is hydrolyzed in the presence of 70% sulfuric acid, according to the technique of Example 1. The hydrolysis product contains 16.65% nitrogen and consist of 65.8% of isomeric monochloro-m-toluenediamines, 30.0% of isomeric dichloro-m-toluenediamines, 1.5% trichloro-m-toluenediamines, and 2.7% nonvolatiles.

EXAMPLE 8

Curing of Polymer A with the mixture of monochloro- and dichloro-m-toluenediamines of Example 7

Prepolymer A of Example 5 (80 g.) is cured with 6.1 g. of the amine mixture of Example 7 for four hours at 100° C. The pot life of the formulation is 3–4 minutes. The following physical properties of the vulcanizates are determined:

Tensile strength, p.s.i. _____ 3850
Elongation at break, percent _____ 450
Modulus 100%, p.s.i. _____ 1280
Split tear D-470, p.l.i. _____ 80
Hardness, Durometer A _____ 90
Resilience, Bashore, percent _____ 48
Compression, Set B, percent _____ 34

EXAMPLE 9

Preparation of polyurethane foam

A high density polyurethane foam is prepared by a batch one-shot procedure using the following formulation in which the diamine mixture of Example 3 is used as a curing agent.

TABLE V

| | Parts |
|---|---|
| (a) Resin masterbatch: | |
| Polypropylene ether glycol, number-average molecular weight about 1040 | 30 |
| Polypropylene ether triol, number-average molecular weight about 1560, obtained by condensing 1,2-propylene oxide with glycerine | 70 |
| Polypropylene ether hexol, number-average molecular weight about 750, obtained by condensing 1,2-propylene oxide with sorbitol | 5 |
| Triethylene diamine, 33% in dipropylene glycol | 0.25 |
| Dibutyltin dilaurate | 0.10 |
| Polydimethylsiloxane, 50 centistoke grade | 0.5 |
| Amine mixture of Example 3 | 12.3 |
| Molecular sieve 5A, a synthetic zeolite having pore openings 5 angstrom units in diameter, available from Union Carbide Corp., Linde Division | 0.4 |
| (b) Diisocyanate: Toluenediisocyanate; 65% 2,4-isomer, 35% 2,6-isomer | 36.0 |

The resin masterbatch is agitated in a suitable container with a high speed laboratory mixer at a temperature of 25° C. for about 30 seconds. The diisocyanate, also at 25° C., is added rapidly to the masterbatch and agitation is continued for 5 seconds after which about 330 grams of the resulting mixture is poured immediately into a 5" x 5" x 1" aluminum mold heated to about 65° C. The lid of the mold is clamped on immediately before any substantial foaming occurs. After 5–10 minutes the foam is demolded and allowed to age for about 16 hours at 25–65° C. The aged foam exhibits the following properties measured by the methods of ASTM D–1564–64T, unless otherwise noted.

TABLE VI

| | |
|---|---|
| Density, lb./cu. ft. | 50 |
| Tensile strength, p.s.i. | 840 |
| Elongation at break, percent | 315 |
| Compression deflection: | |
| 25% deflection, p.s.i. | 167 |
| 50% deflection, p.s.i. | 600 |
| Compression set, Method B, 50% deflection, percent | 22 |
| Hardness, Durometer A (ASTM D–676) | 75 |

What is claimed is:

1. An amine curing agent suitable for curing a polyurethane elastomer consisting essentially of a mixture of 3-chloro-2,6-toluenediamine, 3-chloro-2,4-toluenediamine, and 5-chloro-2,4-toluenediamine, said mixture melting at a temperature lower than 105° C.

2. An amine curing agent suitable for curing a polyurethane elastomer consisting essentially of a mixture of 3-chloro-2,6-toluenediamine, 3-chloro-2,4-toluenediamine, 5-chloro-2,4-toluenediamine, 3,5-dichloro-2,4-toluenediamine, 3,5-dichloro-2,6-toluenediamine, and 5,6-dichloro-2,4-toluenediaine, said mixture containing 50–90% of the first three named curing agents and 50–10% of the last three named curing agents, said mixture melting at a temperature lower than 105° C.

3. A polyurethane elastomer cured by reacting at a temperature of about 70–120° C. a polyurethane prepolymer having free isocyanate end groups with an amine curing agent, the amine curing agent being a composition consisting essentially of a mixture of 3-chloro-2,6-toluenediamine, 3-chloro-2,4-toluenediamine, and 5-chloro-2,4-toluenediamine, said mixture melting at a temperature lower than 105° C. and said amines present in such proportions that there are from 0.6 to 1.1 gram-equivalents of amine groups per gram-equivalent of isocyanate groups.

4. A polyurethane elastomer cured by reacting at a temperature of about 70–120° C. a polyurethane prepolymer having free isocyanate end groups with an amine curing agent, the amine curing agent being a composition consisting essentially of a mixture of 3-chloro-2,6-toluenediamine, 3-chloro-2,4-toluenediamine, 5-chloro-2,4-toluenediamine, 3,5-dichloro-2,4-toluenediamine, 3,5-dichloro-2,6-toluenediamine, and 5,6-dichloro-2,4-toluenediamine, said mixture containing 50–90% of the first three named curing agents and 50–10% of the last three named curing agents, said mixture melting at a temperature lower than 105° C. and said amines present in such proportions that there are from 0.6 to 1.1 gram-equivalents of amine groups per gram-equivalents of isocyanate groups.

References Cited

UNITED STATES PATENTS

| | | | |
|---|---|---|---|
| 3,408,301 | 10/1968 | Sundholm | 260—570 X |
| 3,412,071 | 11/1968 | Sundholm | 260—570 X |
| 3,563,906 | 2/1971 | Hoeschele | 252—182 |

FOREIGN PATENTS

| | | | |
|---|---|---|---|
| 160,506 | 1/1964 | U.S.S.R. | 260—578 |
| 160,507 | 1/1964 | U.S.S.R. | 260—578 |

OTHER REFERENCES

Adams et al., Jour. Am. Chem. Soc., vol. 74, pp. 2608–2612 (1952).

Beilstein, Handbuch der Org. Chemie, Band 4, vol. 13, pp. 123, 140, 164–5 (1930); id. Band 4, vol. 13–II, pp. 62–65 (1950).

Lambooy et al., Jour. Am. Chem. Soc., vol. 74, pp. 1087–1089 (1952).

Muravnik, Chem. Abstr., vol. 61, pp. 5638–5639 (1964).

Yoke, Chem. Abstr., vol. 35, p. 2485 (1941).

DONALD E. CZAJA, Primary Examiner

H. S. COCKERAM, Assistant Examiner

U.S. Cl. X.R.

252—182; 260—2.5 AM, 75 NH